US006625154B1

(12) United States Patent
Murata

(10) Patent No.: US 6,625,154 B1
(45) Date of Patent: Sep. 23, 2003

(54) WIRELESS ASYNCHRONOUS TRANSFER MODE COMMUNICATION SYSTEM AND METHOD OF CONTROLLING BROADCAST

(75) Inventor: Yasukazu Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/419,813

(22) Filed: Oct. 18, 1999

(30) Foreign Application Priority Data

Oct. 19, 1998 (JP) .......................................... 10-313918

(51) Int. Cl.[7] .............................................. H04L 12/56
(52) U.S. Cl. ..................................................... 370/395
(58) Field of Search ................................ 370/395–398, 370/468, 442, 463, 331–338, 328, 316; 455/436, 560, 12.1; 709/104

(56) References Cited

U.S. PATENT DOCUMENTS

| 5,638,371 | A | | 6/1997 | Raychaudhuri et al. ...... 370/347 |
| 5,872,786 | A | * | 2/1999 | Shobatake ................... 370/398 |
| 6,304,571 | B1 | * | 10/2001 | Watanabe .................... 370/398 |
| 6,473,411 | B1 | * | 10/2002 | Kumaki et al. .............. 370/331 |

FOREIGN PATENT DOCUMENTS

| JP | 07-107032 | 4/1995 |
| JP | 08-088651 | 4/1996 |
| JP | 09-018435 | 1/1997 |
| JP | 10-023028 | 1/1998 |

* cited by examiner

Primary Examiner—Kwang Bin Yao
Assistant Examiner—Prenell Jones
(74) Attorney, Agent, or Firm—Foley & Lardner

(57) ABSTRACT

A wireless asynchronous transfer mode communication system performs wireless communications in an asynchronous transfer mode between an access point connected to a network and at least one mobile terminal present in an area covered by the access point. If a received wireless ATM cell is a broadcast wireless ATM cell based on the header information in the received wireless ATM cell, then the mobile terminal compares the header information in the received wireless ATM cell and connection information registered in the mobile terminal itself. If there is agreeing connection information, then the mobile terminal discards the received wireless ATM cell. If there is no agreeing connection information, then the mobile terminal accepts the received wireless ATM cell.

11 Claims, 8 Drawing Sheets

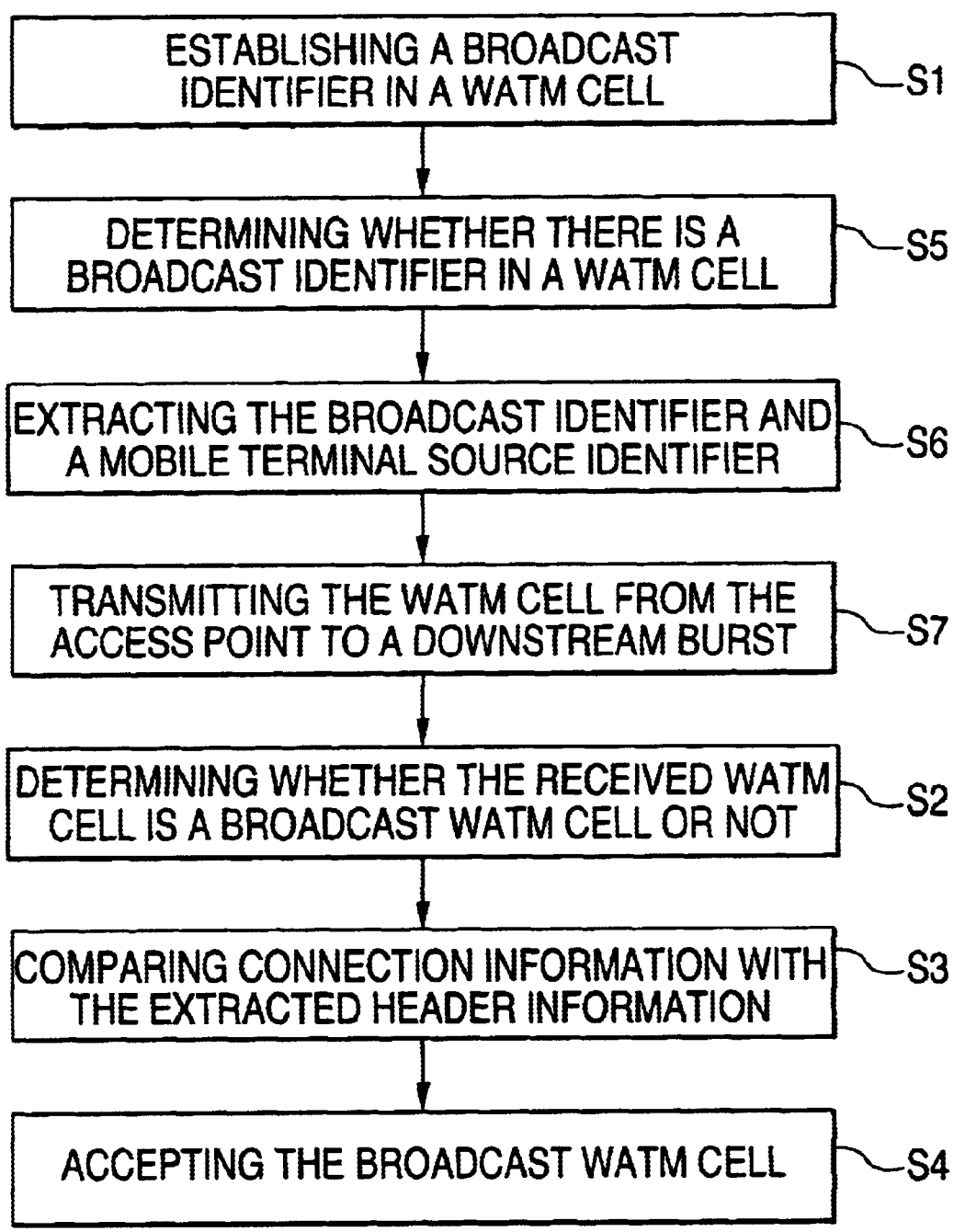

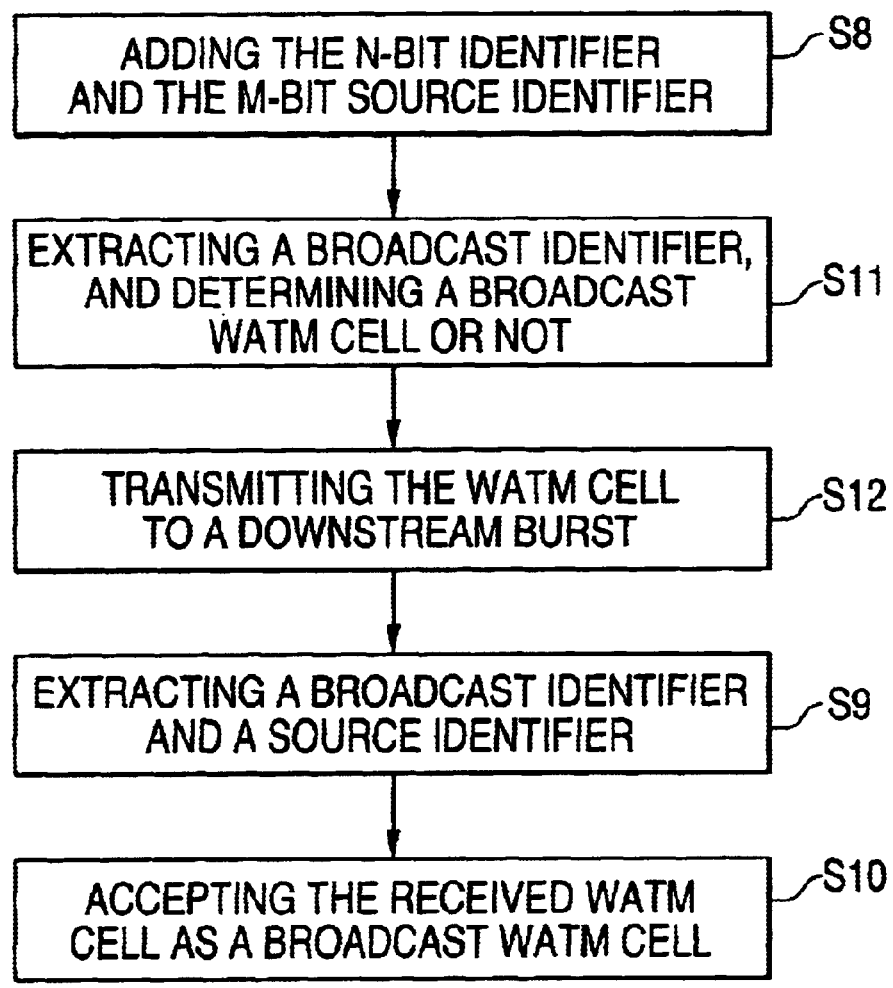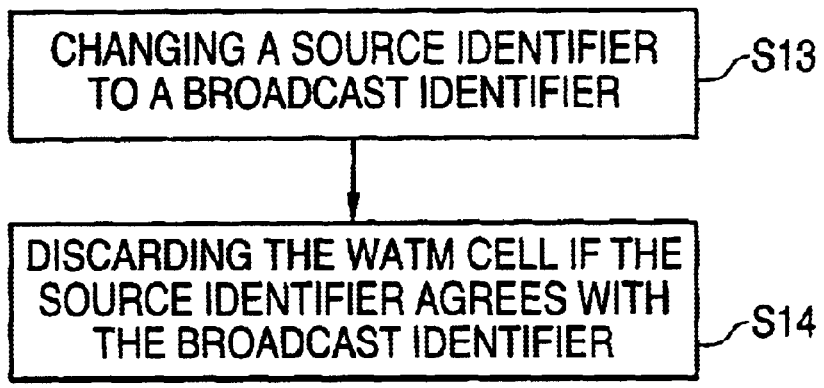

WIRELESS ASYNCHRONOUS TRANSFER MODE COMMUNICATION SYSTEM AND METHOD OF CONTROLLING BROADCAST

BACKGROUND OF THE INVENTION

1. Field of the Invention

The present invention relates to communication apparatus and communication process (protocol), and more particularly to a wireless asynchronous transfer mode communication system for performing wireless communications in an asynchronous transfer mode (ATM) between a base station (access point) connected to a wireless communication network and one or more terminal stations (mobile terminals) present in an area covered by the base station, and a method of controlling broadcast.

2. Description of the Related Art

In recent years, it has been customary to carry out electronic presentations on the terminals of attendees in conference rooms, and distribute file materials as electronic information to meeting attendees via communication links. In such applications, there has been a demand for the simultaneous distribution of data to the terminals via broadcast because it would be time-consuming to transfer the data to each of the terminals individually.

One conventional system proposed to meet such a demand is disclosed in Japanese laid-open patent publication No. 7-107032, for example.

The disclosed system is a wireless communication system for performing broadcast between one or more master stations and a plurality of slave stations. Each of the slave stations is assigned to one or more groups. The master station has a channel switching instruction transmitting means for transmitting a channel switching instruction signal including a group identification number to identify the group of a slave station and indicative of switching to a designated broadcast channel, to all slave stations in a wireless zone. Each of the slave stations has a channel switching means responsive to a channel switching instruction signal including a group identification number representing the group to which the slave station belongs, for switching the communication channel with the master station to the broadcast channel designated by the received channel switching instruction signal, and a channel switching completion signal transmitting means for transmitting a channel switching completion signal to the master station when the process of switching the communication channel as carried out by the channel switching means is completed. The master station also has a broadcast signal transmitting means responsive to a channel switching completion signal from a slave station within the group identified by the group identification number, for transmitting a broadcast signal to all the slave stations in the group using the broadcast channel designated by the channel switching instruction signal. Each of the slave stations further includes a broadcast signal receiving means for receiving the broadcast signal from the master station using the broadcast channel to which the communication channel has switched, after the channel switching completion signal has been transmitted.

In the conventional wireless communication system, the master station transmits a channel switching instruction signal including a group identification number to all slave stations in the wireless zone. Each of the slave stations in the corresponding group switches the communication channel with the master station to the broadcast channel designated by the received channel switching instruction signal. When the process of switching the communication channel is finished, each of the slave stations in the corresponding group transmits a channel switching completion signal to the master station. In response to the channel switching completion signal from the slave station, the master station transmits a broadcast signal to all the slave stations in the group using the broadcast channel designated by the channel switching instruction signal. After having transmitted the channel switching completion signal, each of the slave stations receives the broadcast signal from the master station using the broadcast channel to which the communication channel has switched.

The conventional wireless communication system operates according to such a protocol that a broadcast channel is assigned in advance to single-burst communications and used for broadcast. Since a single burst is used for communications from a base station, it is difficult to perform broadcast that is based on the sharing of a transfer process by all terminals.

SUMMARY OF THE INVENTION

It is therefore an object of the present invention to provide a wireless asynchronous transfer mode communication system for performing broadcast between a plurality of mobile terminals present in an area covered by an access point, and a method of controlling broadcast.

According to an aspect of the present invention, there is provided a wireless asynchronous transfer mode communication system, comprising an access point connected to a wireless communication network for performing wireless communications in an asynchronous transfer mode, an ATM switch connected to the access point, at least one mobile terminal present in an area covered by the access point, for performing wireless communications with the access point, the mobile terminal comprising setting means for establishing a broadcast identifier representative of broadcast in the header of each wireless ATM cell for performing broadcast, determining means for determining the broadcast identifier and header information in the header of each received wireless ATM cell, and switching means for switching between acceptance and discarding of each received wireless ATM cell based on the determined result from the determining means, the access point comprising identifying means for identifying a broadcast identifier in the header of a received wireless ATM cell, and returning means for returning the wireless ATM cell if the broadcast identifier is identified by the identifying means, and transmitting the wireless ATM cell to a downstream burst.

The switching means may comprise means for accepting the wireless ATM cell if the broadcast identifier does not indicate broadcast and if the header information agrees with connection information assigned to the mobile terminal itself, and discarding the wireless ATM cell if the header information does not agree with connection information assigned to the mobile terminal itself, and means for discarding the wireless ATM cell if the broadcast identifier indicates broadcast and if the header information agrees with connection information assigned to the mobile terminal itself, and accepting the wireless ATM cell if the header information does not agree with connection information assigned to the mobile terminal itself.

According to another aspect of the present invention, there is provided a wireless asynchronous transfer mode communication system, comprising an access point connected to a wireless communication network for performing wireless communications in an asynchronous transfer mode, an ATM switch connected to the access point, at least one mobile terminal present in an area covered by the access point, for performing wireless communications with the access point, the mobile terminal comprising setting means for establishing a broadcast identifier representative of broadcast in the wireless overhead of each wireless ATM cell, determining means for extracting the broadcast identifier established in the wireless ATM cell when a downstream burst is received, and determining whether the wireless ATM cell is a broadcast wireless ATM cell or not, comparing means for, if the wireless ATM cell is a broadcast wireless ATM cell, extracting header information of the header of the wireless ATM cell and comparing the extracted header information with connection information assigned to the mobile terminal, and selecting means for, if the extracted header information agrees with the connection information, determining that the wireless ATM cell is a wireless ATM cell transmitted as a broadcast wireless ATM cell from the mobile terminal itself, and discarding the wireless ATM cell, and if the extracted header information does not agree with the connection information, determining that the wireless ATM cell is a wireless ATM cell transmitted from another mobile terminal itself, and accepting the wireless ATM cell, the access point comprising monitoring means for determining whether there is a broadcast identifier in the wireless overhead of the wireless ATM cell received from the mobile terminal, extracting means for, if there is a broadcast identifier in the wireless overhead, extracting the broadcast identifier of the received wireless ATM cell and a mobile terminal source identifier received from the mobile terminal, and returning means for, if the received wireless ATM cell is a broadcast wireless ATM cell, returning the received wireless ATM cell in the access point and transmitting the received wireless ATM cell to a downstream burst.

According to still another aspect of the present invention, there is provided a wireless asynchronous transfer mode communication system, comprising an access point connected to a wireless communication network for performing wireless communications in an asynchronous transfer mode, an ATM switch connected to the access point, at least one mobile terminal present in an area covered by the access point, for performing wireless communications with the access point, the mobile terminal comprising setting means for adding an n-bit broadcast identifier and an m-bit source identifier as connection information to the header of a wireless ATM cell for transmitting broadcast information, extracting means for extracting a broadcast identifier and a source identifier from the connection information in the wireless ATM cell when a downstream burst is received, and selecting means for, if the broadcast identifier is effective, the wireless ATM cell is a broadcast wireless ATM cell, and the extracted broadcast identifier agrees with the source identifier of the mobile terminal itself, discarding the wireless ATM cell, and if the extracted broadcast identifier does not agree with the source identifier of the mobile terminal itself, accepting the wireless ATM cell as a broadcast wireless ATM cell, the access point comprising determining means for extracting a broadcast identifier from the connection information in the header of the received wireless ATM cell, and determining whether the received wireless ATM cell is a broadcast wireless ATM cell based on the extracted broadcast identifier, and returning means for, if the received wireless ATM cell is a broadcast wireless ATM cell, returning the received wireless ATM cell in the access point and transmitting the received wireless ATM cell to a downstream burst.

The access point may comprise means for, if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

According to yet another aspect of the present invention, there is provided a method of controlling broadcast in a wireless communication network for performing wireless communications in a wireless asynchronous transfer mode, the wireless communication network having an access point, an ATM switch connected to the access point, and at least one mobile terminal present in an area covered by the access point, for performing wireless communications with the access point, comprising the steps of establishing, with the mobile terminal, a broadcast identifier representative of broadcast in the header of each wireless ATM cell for performing broadcast, identifying, with the access point, a broadcast identifier in the header of each wireless ATM cell received from the mobile terminal, returning, with the access point, the wireless ATM cell if the broadcast identifier is identified, and transmitting the wireless ATM cell to a downstream burst, determining, with the mobile terminal, the broadcast identifier and header information in the header of each received wireless ATM cell, and switching, with the mobile terminal, between acceptance and discarding of each received wireless ATM cell based on the determined result, the step of switching comprising the steps of accepting the wireless ATM cell if the broadcast identifier does not indicate broadcast and if the header information agrees with connection information assigned to the mobile terminal itself, and discarding the wireless ATM cell if the header information does not agree with connection information assigned to the mobile terminal itself, and discarding the wireless ATM cell if the broadcast identifier indicates broadcast and if the header information agrees with connection information assigned to the mobile terminal itself, and accepting the wireless ATM cell if the header information does not agree with connection information assigned to the mobile terminal itself.

According to yet still another aspect of the present invention, there is provided a method of controlling broadcast in a wireless communication network for performing wireless communications in a wireless asynchronous transfer mode, the wireless communication network having an access point, an ATM switch connected to the access point, and at least one mobile terminal present in an area covered by the access point, for performing wireless communications with the access point, comprising the steps of establishing, with the mobile terminal, a broadcast identifier representative of broadcast in the wireless overhead of each wireless ATM cell, determining, with the access point, whether there is a broadcast identifier in the wireless overhead of the wireless ATM cell received from the mobile terminal, if there is a broadcast identifier in the wireless overhead, extracting, with the access point, the broadcast identifier of the received wireless ATM cell and a mobile terminal source identifier received from the mobile terminal, if the received wireless ATM cell is a broadcast wireless ATM cell, returning, with the access point, the received wireless ATM cell in the access point and transmitting the received wireless ATM cell to a downstream burst, extracting, with the mobile terminal, the broadcast identifier established in the wireless ATM cell when a downstream burst is received, and determining whether the wireless ATM cell is a broadcast wireless ATM cell or not, if the wireless ATM cell is a broadcast wireless ATM cell, extracting, with the mobile terminal, header information of the header of the wireless ATM cell and comparing, with the mobile terminal, the extracted header information with connection information assigned to the mobile terminal, and if the extracted header information agrees with the connection information, determining, with the mobile terminal, that the wireless ATM cell is a wireless ATM cell transmitted as a broadcast wireless ATM cell from the mobile terminal itself, and discarding the wireless ATM cell with the mobile terminal, and if the extracted header information does not agree with the connection information, determining, with the mobile terminal, that the wireless ATM cell is a wireless ATM cell transmitted from another mobile terminal itself, and accepting the wireless ATM cell with the mobile terminal.

According to a further aspect of the present invention, there is provided a method of controlling broadcast in a wireless communication network for performing wireless communications in a wireless asynchronous transfer mode, the wireless communication network having an access point, an ATM switch connected to the access point, and at least one mobile terminal present in an area covered by the access point, for performing wireless communications with the access point, comprising the steps of adding, with the mobile terminal, an n-bit broadcast identifier and an m-bit source identifier as connection information to the header of a wireless ATM cell for transmitting broadcast information, extracting, with the access point, a broadcast identifier from the connection information in the header of the received wireless ATM cell, and determining, the access point, whether the received wireless ATM cell is a broadcast wireless ATM cell based on the extracted broadcast identifier, if the received wireless ATM cell is a broadcast wireless ATM cell, returning, with the access point, the received wireless ATM cell in the access point and transmitting the received wireless ATM cell to a downstream burst, extracting, with the mobile terminal, a broadcast identifier and a source identifier from the connection information in the wireless ATM cell when a downstream burst is received, and if the broadcast identifier is effective, the wireless ATM cell is a broadcast wireless ATM cell, and the extracted broadcast identifier agrees with the source identifier of the mobile terminal itself, discarding the wireless ATM cell with the mobile terminal, and if the extracted broadcast identifier does not agree with the source identifier of the mobile terminal itself, accepting the wireless ATM cell as a broadcast wireless ATM cell with the mobile terminal.

The step of determining, with the access point, whether the received wireless ATM cell is a broadcast wireless ATM cell may comprise the steps of, if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

The present invention thus provides a wireless asynchronous transfer mode communication system for performing broadcast between a plurality of mobile terminals present in an area covered by an access point, and a method of controlling broadcast.

According to the present invention, the mobile terminal establishes a broadcast identifier in the header of a wireless ATM cell, and the access point identifies the received wireless ATM cell as a broadcast wireless ATM cell for thereby making it possible to return the wireless ATM cell. Even if data is transmitted from the access point to the mobile terminal by broadcast, using a single burst, the mobile terminal which has performed broadcast does no receive data transmitted thereby.

Furthermore, data transmission efficiency is prevented from being lowered even when broadcast is carried out to transmit n copies of a broadcast WATM cell to respective n mobile terminals that are controlled by an access point, using a single burst.

The above and other objects, features, and advantages of the present invention will become apparent from the following description with reference to the accompanying drawings which illustrate examples of the present invention.

BRIEF DESCRIPTION OF THE DRAWINGS

FIG. 7 is a flowchart of an operation sequence of wireless communications between the mobile terminals and the access point according to a first embodiment of the present invention;

FIG. 8 is a flowchart of an operation sequence of wireless communications between the mobile terminals and the access point according to a second embodiment of the present invention; and FIG. 9 is a flowchart of an operation sequence for preventing a cell from being transmitted again from the access point in a returning mode of the mobile terminal.

DESCRIPTION OF THE PREFERRED EMBODIMENTS

Figure 1:
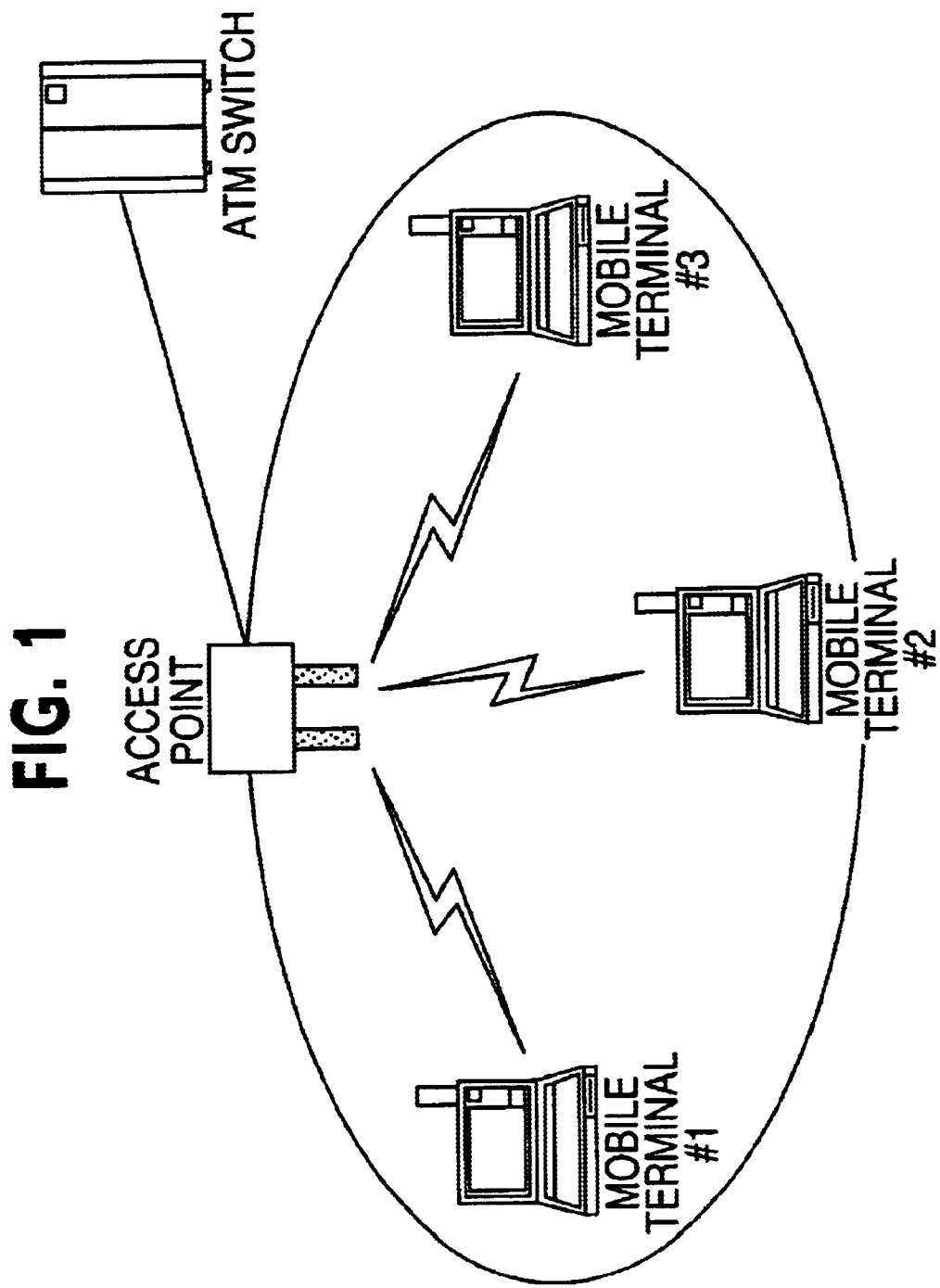
FIG. 1 is a diagram showing a wireless asynchronous transfer mode communication system according to the present invention.
Figure 2:
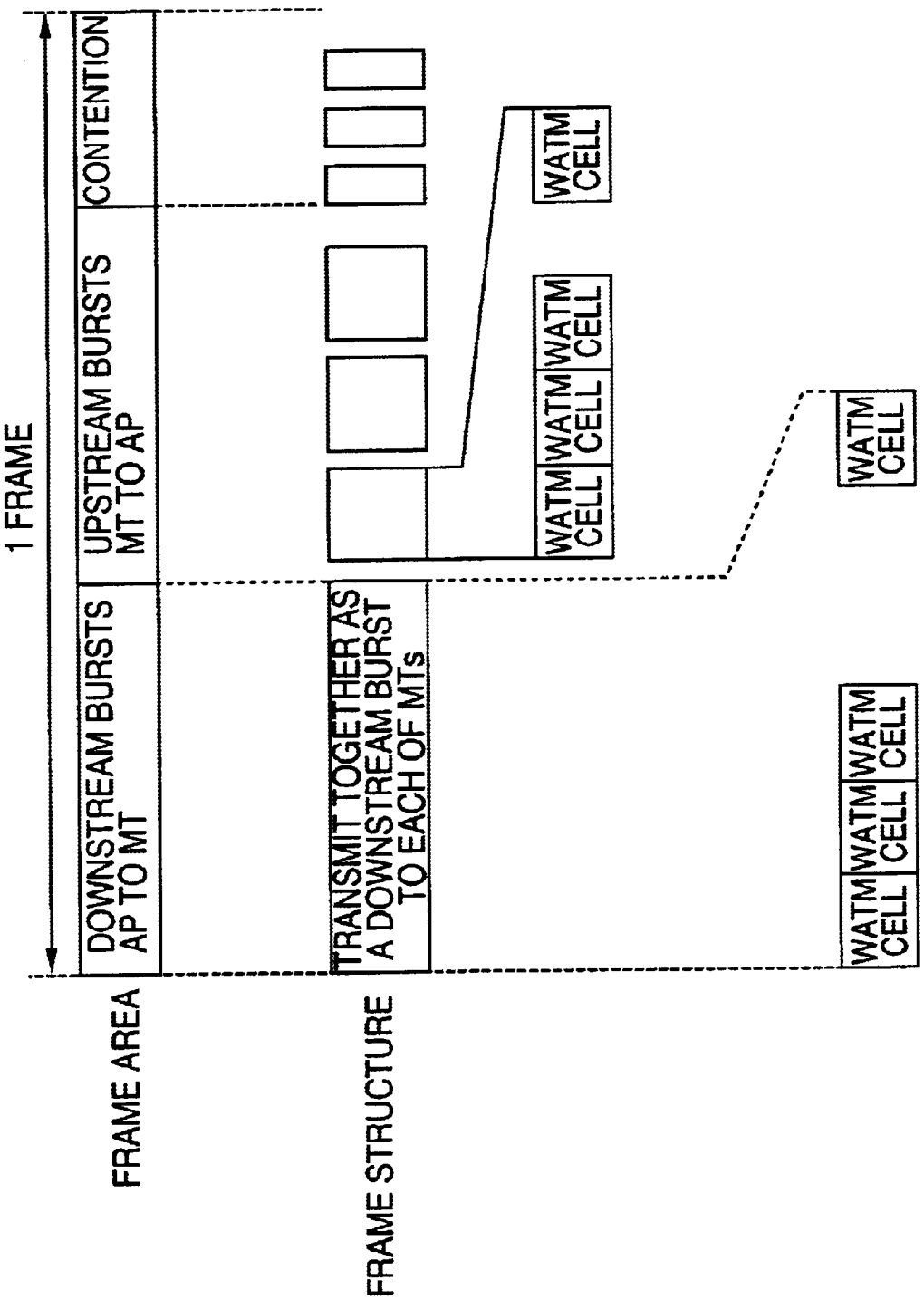
FIG. 2 is a diagram showing, by way of example, a frame structure of data transmitted and received between mobile terminals and an access point of the wireless asynchronous transfer mode communication system shown in FIG. 1.

A common system arrangement and frame structure of first and second embodiments of the present invention will first be described below. FIG. 1 shows a wireless asynchronous transfer mode communication system (hereinafter referred to as a "wireless ATM system") according to the present invention. FIG. 2 shows, by way of example, a frame structure of data transmitted and received between mobile terminals (MT) and an access point (AP) of the wireless ATM system shown in FIG. 1.

In FIG. 1, for carrying out radio communications, which is one form of wireless communications, the access point and the mobile terminals communicate with each other via a wireless interface (dynamic TDMA (Time Division Multiple Access)/TDD frame). An ATM switch is connected to a network (ATM communication network), and has a function to transmit an ATM cell to the access point which is indicated by the contents of a header included in the ATM cell that is received via the network (ATM communication network). The ATM switch carries out a broadcast control process for performing wireless communications in the ATM between the access point and one or more mobile terminals connected to the wireless communication network system.

FIG. 2 shows, by way of example, a frame structure of data transmitted and received between the mobile terminals and the access point of the wireless ATM system shown in FIG. 1. As shown in FIG. 2, one frame comprises frame areas including a frame area for downstream bursts (data transfer from the access point to the mobile terminals), a frame area for upstream bursts (data transfer from the mobile terminals to the access point), and a contention area.

The frame area for downstream bursts includes a plurality of wireless ATM cells (WATM cells) transmitted together as a downstream burst to each of the mobile terminals. The frame area for upstream bursts includes a plurality of blocks comprising a plurality of wireless ATM cells (WATM cells).

Figure 3:
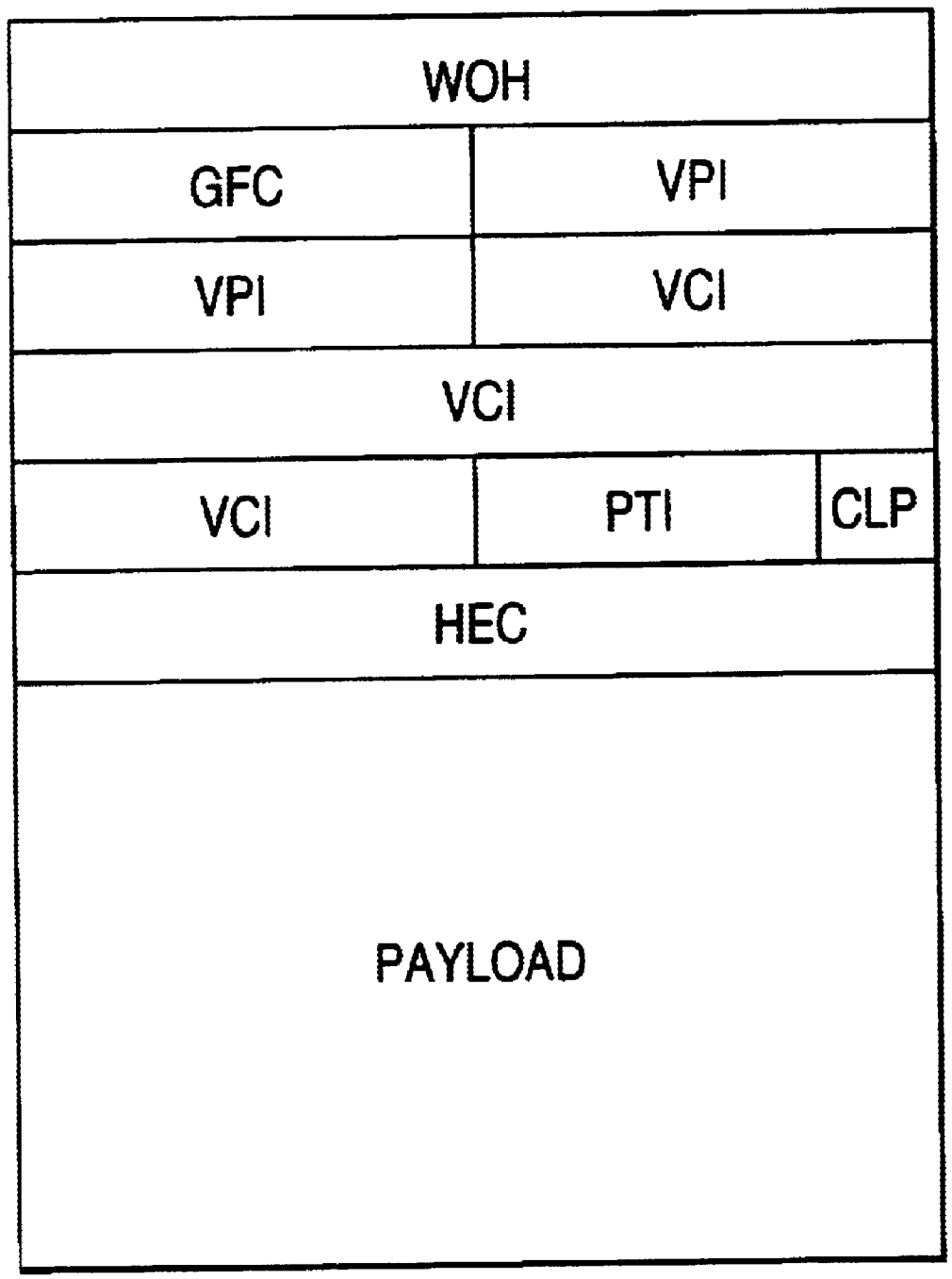
FIG. 3 is a diagram of a wireless ATM cell of the frame structure of the data shown in FIG. 2.
Figure 5:
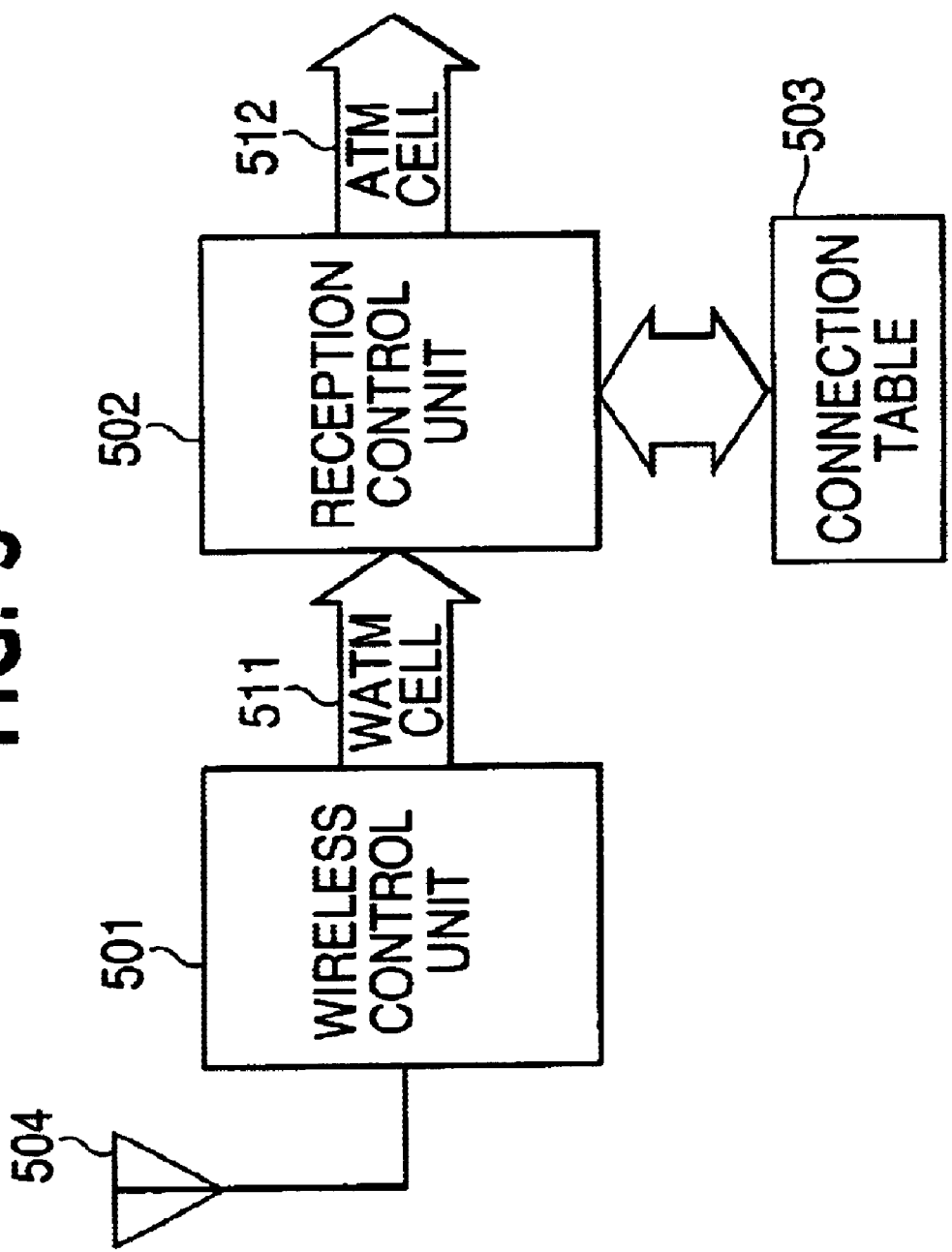
FIG. 5 is a functional block diagram illustrative of operation of a reception control section of each of the mobile terminals of the wireless asynchronous transfer mode communication system shown in FIG. 1.

FIG. 3 shows a wireless ATM cell (WATM cell) of the frame structure of the data shown in FIG. 2. FIG. 5 is a functional block diagram illustrative of operation of a reception control section of each of the mobile terminals of the wireless ATM system shown in FIG. 1.

The wireless ATM systems according to the first and second embodiments of the present invention reside in that they have a function to perform wireless communications in the ATM mode between the access point (AP) connected to the network (ATM network) and at least one mobile terminals (MT) present in the area covered by the access point. Each of the mobile terminals has a means which, if a received WATM cell is not a WATM cell for broadcast based on header information (GFC, VPI, VCI, PTI, CLP, HEC, etc.) contained in the received WATM cell, compares the header information (GFC, VPI, VCI, PTI, CLP, HEC, etc.) contained in the received WATM cell with connections registered in the mobile terminal itself, and which, if there is a connection which agrees with the header information, accepts the received WATM cell, and if there no connection which agrees with the header information, discards the received WATM cell.

Information to be transmitted in the wireless ATM systems according to the first and second embodiments of the present invention comprises a WATM cell shown in FIG. 3 which is handled as a basic information unit. For data transfer from the access point to the mobile terminals, a plurality of WATM cells destined for a plurality of mobile terminals are transmitted as a downstream burst from the access point. Each of the mobile terminals receives all the WATM cells in the downstream burst, but accepts only those WATM cells which are determined as belonging to the mobile terminal itself from the header information (GFC, VPI, VCI, PTI, CLP, HEC, etc.) contained in the received WATM cells. Connection information for data transfer has been assigned to each of the mobile terminals upon call setting.

The header information (GFC, VPI, VCI, PTI, CLP, HEC, etc.) of WATM cells comprises generic flow control (GFC), a virtual path identifier (VPI), a virtual channel identifier (VCI), a payload type identifier (PTI), a cell loss priority (CLP), and header error control (HEC), etc. The connection information comprises a virtual path identifier (VPI) and a virtual channel identifier (VCI), etc.

If a received WATM cell is not a WATM cell for broadcast based on header information (GFC, VPI, VCI, PTI, CLP, HEC, etc.) contained in the received WATM cell, then each of the mobile terminals compares the header information (GFC, VPI, VCI, PTI, CLP, HEC, etc.) contained in the received WATM cell with connections registered in the mobile terminal itself. If there is a connection which agrees with the header information, the mobile terminal accepts the received WATM cell, and if there no connection which agrees with the header information, the mobile terminal discards the received WATM cell.

Figure 4:
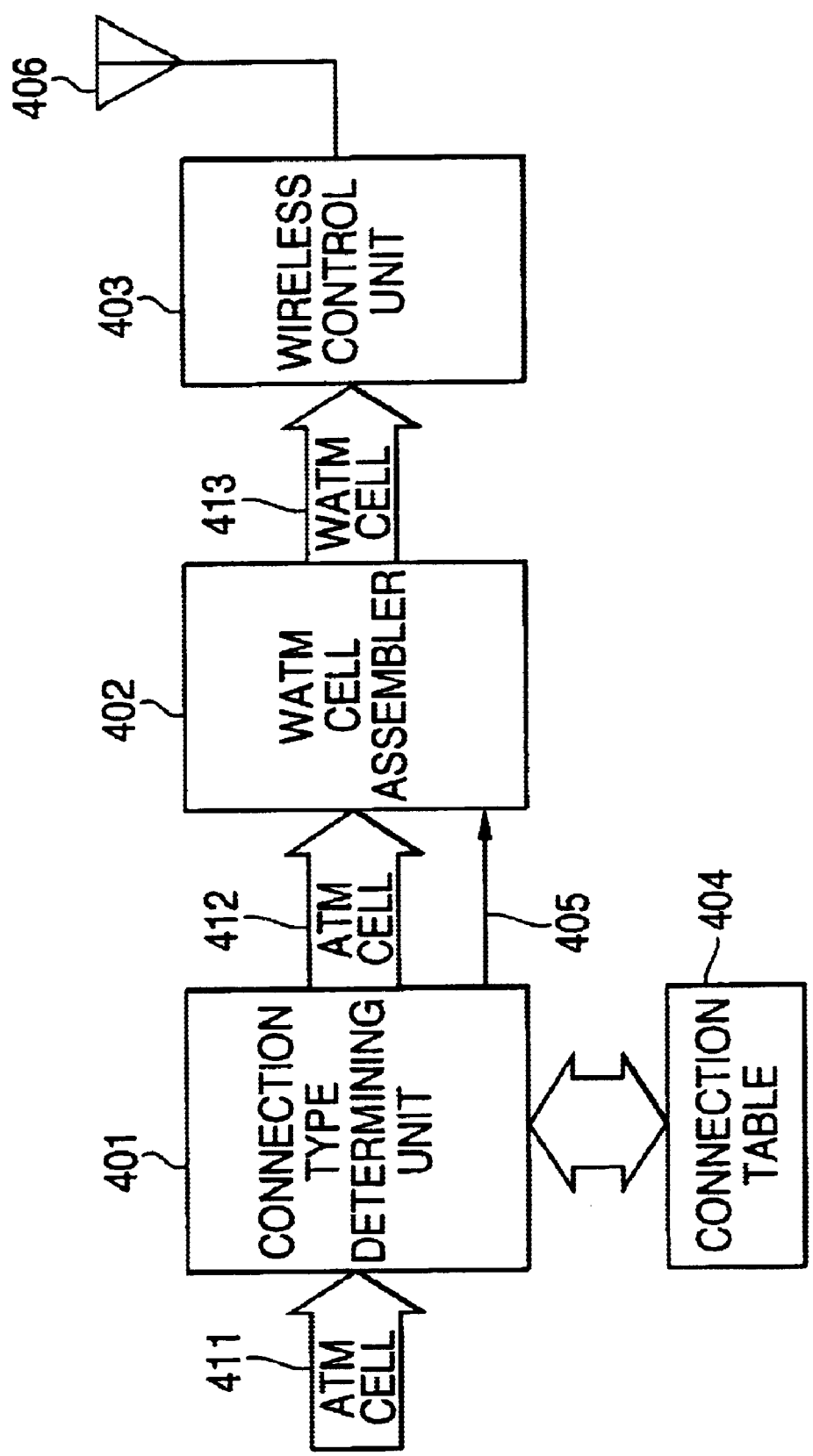
FIG. 4 is a functional block diagram illustrative of operation of a transmission control section of each of the mobile terminals of the wireless asynchronous transfer mode communication system shown in FIG. 1.

1st Embodiment:

FIG. 4 is a functional block diagram illustrative of operation of a transmission control section of each of the mobile terminals of the wireless ATM system shown in FIG. 1. Each of the mobile terminals transmits a plurality of WATM cells to be transmitted to an upstream burst in a frame which has been designated. The positional information of an indicated burst is given as follows: The mobile terminal sends a request for a burst assignment to the contention area to the access point, and, based on the request, the access point assigns burst position information to the mobile terminal, and indicates the assigned burst position information to the mobile terminal which has made the request.

As shown in FIG. 4, connection type determining unit 401 extracts an ATM cell header from ATM cell 411 to be transmitted by way of broadcast, and reads information for determining whether ATM cell 411 is a cell to be transmitted by way of broadcast from the header information (GFC, VPI, VCI, PTI, CLP, HEC, etc.) and connection table 404 which contains a registered broadcast relationship. If ATM cell 411 is a cell to be transmitted by way of broadcast, then connection type determining unit 401 makes broadcast instruction signal 405 active, and sends broadcast instruction signal 405 together with the ATM cell to WATM cell assembler 402.

If broadcast instruction signal 405 is active, then WATM cell assembler 402 establishes a broadcast identifier in WATM cell overhead, gives the ATM cell overhead to ATM cell 412, and sends ATM cell 413 to wireless control unit 403. Wireless control unit 403 transmits ATM cell 413 via transmission antenna 406 to a burst position which has been assigned to an air interface.

The broadcast identifier employed by WATM cell assembler 402 comprises k bits. It is possible to perform group broadcast when information bits of the broadcast identifier are recognized by a group to which broadcast is to be made.

Figure 6:
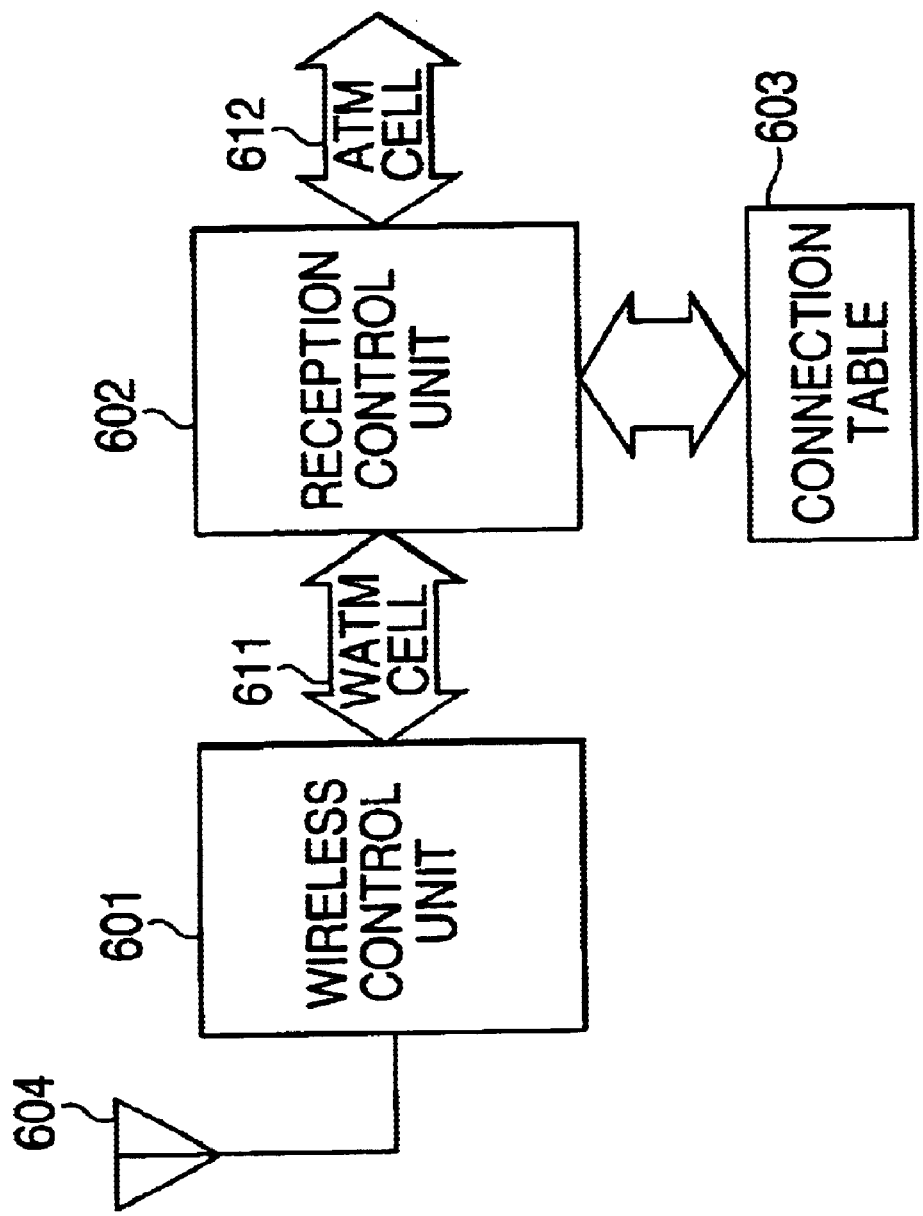
FIG. 6 is a functional block diagram of the access point of the wireless asynchronous transfer mode communication system shown in FIG. 1.

Operation of the access point according to the first embodiment will be described below. FIG. 6 is a functional block diagram of the access point of the wireless ATM system shown in FIG. 1. The access point has a means for determining whether there is a broadcast identifier in the wireless overhead WOH of a WATM cell received from a mobile terminal. The access point also has a means for, if there is a broadcast identifier in the wireless overhead WOH, extracting the broadcast identifier of the received WATM cell and a mobile terminal source identifier received from the mobile terminal. The access point further includes a means for discarding the received WATM cell from the mobile terminal if the broadcast identifier is effective, the WATM cell received from the mobile terminal is effective as a broadcast cell, the mobile terminal is set to a returning mode, and the mobile terminal source identifier of a returned WATM cell and the broadcast identifier of the mobile terminal itself agree with each other, and accepts the WATM cell received from the mobile terminal if the mobile terminal source identifier and the broadcast identifier of the mobile terminal itself do not agree with each other.

Specifically, as shown in FIG. 6, reception control unit 602 extracts a broadcast identifier from the WATM cell overhead of WATM cell 611 received via antenna 604 and wireless control unit 601, determines whether WATM cell 611 is a broadcast WATM cell or not based on the extracted broadcast identifier, and if WATM cell 611 is a broadcast WATM cell, returns the broadcast WATM cell in the access point.

The process of returning broadcast WATM cell in the access point is a process of returning WATM cell 611 as WATM cell 612 from reception control unit 602 to wireless control unit 601, and transmitting WATM cell 612 to a single downstream burst from wireless control unit 601.

If WATM cell 611 is not a broadcast WATM cell, then reception control unit 602 compares connection information (VPI, VCI, etc.) registered in connection table 603 with connection information (VPI, VCI, etc.) (ATM cell header) of WATM cell 611. If there is an agreeing connection, then reception control unit 602 removes the overhead from the WATM cell, and receives the WATM cell as ATM cell 612.

Operation of the mobile terminal according to the first embodiment will be described below. FIG. 5 is a functional block diagram illustrative of operation of a reception control section of each of the mobile terminals of the wireless asynchronous transfer mode communication system shown in FIG. 1. For establishing independent connections for communications between the mobile terminals for broadcast, each of the mobile terminals has a means for establishing a broadcast identifier indicative of broadcast information in the wireless overhead (WOH shown in FIG. 3) of a broadcast cell upon transmission of the broadcast information. Each of the mobile terminals also has a means for extracting a broadcast identifier from the wireless overhead of a WATM cell when a downstream burst is received, and determining whether the received WATM cell is a broadcast WATM cell or not base on the extracted broadcast identifier.

Specifically, as shown in FIG. 5, each of the mobile terminals receives a WATM cell returned to a single downstream burst via transmission/reception antenna 504 and wireless control unit 501, and gives received WATM cell 511 to reception control unit 502, which extracts a broadcast identifier from the wireless overhead of WATM cell 511.

In this embodiment, transmission/reception antenna 504 can switch in time between a transmission mode and a reception mode. In FIG. 6, transmission/reception antenna 504 is in the reception mode.

Each of the mobile terminals has a means for extracting connection information (VPI, VCI, etc.) which is the header information (GFC, VPI, VCI, PTI, CLP, HEC, etc.) contained in a WATM cell if the WATM cell is a broadcast WATM cell, and comparing connection information assigned for communications of the mobile terminal which has received the extracted connection information (VPI, VCI, etc.) with the extracted header information (GFC, VPI, VCI, PTI, CLP, HEC, etc.).

Each of the mobile terminals also has a means which compares the connection information (VPI, VCI, etc.) extracted from the received WATM cell with the connection information (VPI, VCI, etc.) managed by the mobile terminal, which, if the connection information (VPI, VCI, etc.) extracted from the received WATM cell agrees with the connection information (VPI, VCI, etc.) managed by the mobile terminal, determines that the received WATM cell is the broadcast WATM cell which has been transmitted from the mobile station itself and discards the received WATM cell, and which, if the connection information (VPI, VCI, etc.) extracted from the received WATM cell does not agree with the connection information (VPI, VCI, etc.) managed by the mobile terminal, determines that the received WATM cell is a broadcast WATM cell which has been transmitted from another mobile terminal and accepts the broadcast WATM cell which has been transmitted from the other mobile terminal.

Specifically, as shown in FIG. 5, each of the mobile terminals determines whether received WATM cell 511 is a broadcast WATM cell or not. If the received WATM cell is a broadcast WATM cell, then the mobile terminal confirms whether the connection information (VPI, VCI, etc.) of received WATM cell 511 agrees with the connection information (VPI, VCI, etc.) of the mobile terminal itself by referring to connection table 503. If the connection information (VPI, VCI, etc.) of received WATM cell 511 agrees with the connection information (VPI, VCI, etc.) of the mobile terminal itself, then the mobile terminal determines that received WATM cell 511 is a WATM cell transmitted by the mobile terminal itself, and discards received WATM cell 511. If the connection information (VPI, VCI, etc.) of received WATM cell 511 does not agree with the connection information (VPI, VCI, etc.) of the mobile terminal itself, then the mobile terminal determines that received WATM cell 511 is a broadcast WATM cell, and accepts received WATM cell 511.

Group broadcast is made possible by setting up in advance a broadcast identifier among terminals to which broadcast is to be made. It is also possible to effect broadcast on all users by establishing a unified identifier in the entire system.

A method of controlling broadcast (communication protocol) in the wireless ATM system according to the first embodiment will be described below. FIG. 7 shows an operation sequence of wireless communications between the mobile terminals and the access point according to the first embodiment of the present invention.

For establishing independent connections for communications between the mobile terminals for broadcast in the wireless ATM system according to the first embodiment, each of the mobile terminals executes steps S1 through S4, and the access point executes steps S5 through S7 in synchronism therewith.

Step S1 is a step which establishes a broadcast identifier indicative of broadcast information in a broadcast WATM cell upon transmission of the broadcast information. Step S2 is a step which, upon reception of a downstream burst, extracts a broadcast identifier in the wireless overhead of a received WATM cell, and determines whether the received WATM cell is a broadcast WATM cell or not.

Step S3 is a step which, if the received WATM cell is a broadcast WATM cell, extracts connection information (VPI, VCI, etc.) which is the header information (GFC, VPI, VCI, PTI, CLP, HEC, etc.) contained in the WATM cell, and compares connection information assigned for communications of the mobile terminal which has received the extracted connection information (VPI, VCI, etc.) with the extracted header information (GFC, VPI, VCI, PTI, CLP, HEC, etc.).

Step S4 is a step which compares the connection information (VPI, VCI, etc.) extracted from the received WATM cell with the connection information (VPI, VCI, etc.) managed by the mobile terminal, which, if the connection information (VPI, VCI, etc.) extracted from the received WATM cell agrees with the connection information (VPI, VCI, etc.) managed by the mobile terminal, determines that the received WATM cell is the broadcast WATM cell which has been transmitted from the mobile station itself and discards the received WATM cell, and which, if the connection information (VPI, VCI, etc.) extracted from the received WATM cell does not agree with the connection information (VPI, VCI, etc.) managed by the mobile terminal, determines that the received WATM cell is a broadcast WATM cell which has been transmitted from another mobile terminal and accepts the broadcast WATM cell which has been transmitted from the other mobile terminal.

The access point executes steps S5 through S7. Step S5 is a step which determines whether there is a broadcast identifier in the wireless overhead WOH of a WATM cell received from a mobile terminal. Step S6 is a step which, if there is a broadcast identifier in the wireless overhead WOH, extracts the broadcast identifier of the received WATM cell and a mobile terminal source identifier received from the mobile terminal. Step S7 is a step which transmits the WATM cell as broadcast from the access point to a downstream burst if the broadcast identifier is effective, and the WATM cell received from the mobile terminal is effective as a broadcast cell.

According to the first embodiment, as described above, reception operation of a mobile terminal is determined using a broadcast identifier, i.e., operation to receive data destined for a mobile terminal itself is determined by data except for information transmitted from the mobile terminal itself, and a broadcast call is returned in an access point, so that a source station can receive data transmitted by the source station itself. Therefore, even when broadcast is carried out to transmit data from the access point to the mobile terminal using a single burst, data transmitted from the mobile station itself will not be received as a broadcast WATM cell.

Furthermore, data transmission efficiency is prevented from being lowered even when broadcast is carried out to transmit n copies of a broadcast WATM cell to respective n mobile terminals that are controlled by an access point, using a single burst.

If a mobile terminal is in a returning mode when a WATM cell received from a mobile terminal by an access point is determined as a broadcast WATM cell based on an effective broadcast identifier, then a WATM cell transmitted in a downstream burst from the access point is returned by the mobile terminal, and hence wasteful transmissions and receptions will be repeated between the access point and the mobile terminal. To prevent such wasteful transmissions and receptions from occurring, when the WATM cell is returned, a source identifier is changed to a broadcast identifier, and if the source identifier of the mobile terminal which has returned the WATM cell agrees with the broadcast identifier of the mobile terminal itself, then the WATM cell received from the mobile terminal is discarded.

FIG. 9 shows an operation sequence for preventing a cell from being transmitted again from the access point in a returning mode of the mobile terminal. In FIG. 9, step S13 is a step of changing a source identifier to a broadcast identifier when a WATM cell is returned, and step S14 is a step of discarding the WATM cell received from the mobile terminal if the source identifier of the mobile terminal which has returned the WATM cell agrees with the broadcast identifier of the mobile terminal itself.

2nd Embodiment:

FIG. 4 is a functional block diagram illustrative of operation of a transmission control section of each of the mobile terminals of the wireless ATM system shown in FIG. 1. In each of the mobile terminals, if the broadcast instruction signal 405 is active, then a process of adding a broadcast identifier to wireless overhead is determined in advance. Each of the mobile terminals writes a broadcast identifier registered in WATM cell assembler 402 and the source identifier of a transmitting mobile terminal, as connection information (VPI, VCI, etc.), in connection information (ATM cell header) of an ATM cell, assembles WATM cell 413, and sends WATM cell 413 to wireless control unit 403, which transmits WATM cell 413 via transmission antenna 406 into the air.

Operation of the access point according to the second embodiment will be described below. FIG. 6 is a functional block diagram of the access point of the wireless ATM system shown in FIG. 1. The access point has a means for extracting a broadcast identifier contained in the header information (GFC, VPI, VCI, PTI, CLP, HEC, etc.) of a received WATM cell, and determining whether the received WATM cell is a broadcast WATM cell based on the extracted broadcast identifier. The access point also has a means for, if the received WATM cell is a broadcast WATM cell, returning the received WATM cell in the access point and transmitting it to a downstream burst.

Specifically, reception controller 602 extracts connection information (VPI, VCI, etc.) from WATM cell 611, and compares the extracted connection information (VPI, VCI, etc.) with connection table 603.

Then, based on the compared result, the access point determines whether the extracted connection information (VPI, VCI, etc.) represents a broadcast connection or not. If the received WATM cell is a broadcast WATM cell, then it is returned in the access point.

The process of returning a broadcast WATM cell in the access point is a process of returning received WATM cell 611 to wireless control unit 601, which transmits the WATM cell to a single downstream burst.

Operation of the mobile terminal according to the second embodiment will be described below. FIG. 5 is a functional block diagram illustrative of operation of a reception control section of each of the mobile terminals of the wireless asynchronous transfer mode communication system shown in FIG. 1. Each of the mobile terminals has a means which, when broadcast information is transmitted if there is established a broadcast connection for broadcast communications including an n-bit broadcast identifier and an m-bit source identifier which is a transmitting terminal identifier, between the mobile terminal and the access point for carrying out broadcast communications, adds the n-bit broadcast identifier and the m-bit source identifier to a storage area storing the connection information (VPI, VCI, etc.) of a WATM cell for transmitting broadcast information. Each of the mobile terminals also has a means which, when a downstream burst is received, extracts a broadcast identifier and a source identifier from the connection information (VPI, VCI, etc.) of a received WATM cell.

Specifically, reception control unit 502 extracts connection information (VPI, VCI, etc.) from the header information (GFC, VPI, VCI, PTI, CLP, HEC, etc.) in a WATM cell received via transmission/reception antenna 504 and wireless control unit 501.

Each of the mobile terminals further includes a means for discarding a received WATM cell if a broadcast identifier is effective, the received WATM cell is a broadcast WATM cell, and an extracted source identifier and the source identifier of the mobile terminal itself agree with each other, and accepting the received WATM cell as a broadcast WATM cell if the extracted source identifier and the source identifier of the mobile terminal itself do not agree with each other.

Specifically, each of the mobile terminals extracts a broadcast identifier and a transmitting terminal identifier (source identifier) from the extracted connection information (VPI, VCI, etc.). If the broadcast identifier agrees with a broadcast value determined between the mobile terminals and the transmitting terminal identifier (source identifier) is different from the value of the mobile terminal itself, then each of the mobile terminals receives the WATM cell as a broadcast WATM cell. If the broadcast identifier agrees with a broadcast value determined between the mobile terminals and the transmitting terminal identifier (source identifier) also agrees with the value of the mobile terminal itself, then each of the mobile terminals determines that the WATM cell as broadcast information transmitted by the mobile terminal itself, and discards the received WATM cell.

Group broadcast is made possible by setting up in advance a broadcast identifier among terminals to which broadcast is to be made. It is also possible to effect broadcast on all users by establishing a unified identifier in the entire system.

A method of controlling broadcast (communication protocol) in the wireless ATM system according to the second embodiment will be described below. FIG. 8 shows an operation sequence of wireless communications between the mobile terminals and the access point according to the second embodiment of the present invention.

If broadcast connections for broadcast communications including an n-bit broadcast identifier and an m-bit source identifier which is a transmitting terminal identifier, are established between the mobile terminal and the access point for carrying out broadcast communications, in the wireless ATM system according to the second embodiment, then each of the mobile terminals executes steps S8 through S10, and the access point executes steps S11 and S12 in synchronism therewith.

Step S8 is a step of adding the n-bit broadcast identifier and the m-bit source identifier to a storage area storing the connection information (VPI, VCI, etc.) of a WATM cell for transmitting broadcast information.

Step S9 is a step of extracting a broadcast identifier and a source identifier from the connection information (VPI, VCI, etc.) of a received WATM cell.

Step S10 is a step which, if the broadcast identifier is effective, the received WATM cell is a broadcast WATM cell, and the extracted source identifier and the source identifier of the mobile terminal itself agree with each other, discards the received WATM cell, and if the extracted source identifier and the source identifier of the mobile terminal itself do not agree with each other, accepts the received WATM cell as a broadcast WATM cell.

Step S11 is a step of extracting a broadcast identifier contained in the header information (GFC, VPI, VCI, PTI, CLP, HEC, etc.) in the received WATM cell, and determining whether the received WATM cell is a broadcast WATM cell or not.

Step S12 is a step which, if the received WATM cell is a broadcast WATM cell, returns the received WATM cell in the access point, and transmits the WATM cell to a downstream burst.

According to the second embodiment, as described above, reception operation of a mobile terminal is determined using a broadcast identifier, i.e., operation to receive data destined for a mobile terminal itself is determined by data except for information transmitted from the mobile terminal itself, and a broadcast call is returned in an access point, so that a source station can receive data transmitted by the source station itself. Therefore, even when broadcast is carried out to transmit data from the access point to the mobile terminal using a single burst, data transmitted from the mobile station itself will not be received as a broadcast WATM cell.

Furthermore, data transmission efficiency is prevented from being lowered even when broadcast is carried out to transmit n copies of a broadcast WATM cell to respective n mobile terminals that are controlled by an access point, using a single burst.

The present invention is not limited to the first and second embodiments described above. However, the principles of the present invention are also applicable to a wireless asynchronous transfer mode communication system based on optical communications. The number, position, configuration, etc. of the various components of the system are not limited to the illustrated details, but may be selected as desired appropriately for embodying the present invention. Identical components are denoted by identical reference characters throughout views.

While preferred embodiments of the present invention have been described using specific terms, such description is for illustrative purposes only, and it is to be understood that changes and variations may be made without departing from the spirit or scope of the following claims.

What is claimed is:

1. A wireless asynchronous transfer mode communication system, comprising:
   an access point connected to a wireless communication network for performing wireless communications in an asynchronous transfer mode;
   an ATM switch connected to said access point;
   at least one mobile terminal present in an area covered by said access point, for performing wireless communications with said access point;
   said mobile terminal comprising:
      setting means for establishing a broadcast identifier representative of broadcast in the header of each wireless ATM cell for performing broadcast;
      determining means for determining the broadcast identifier and header information in the header of each received wireless ATM cell; and
      switching means for switching between acceptance and discarding of each received wireless ATM cell based on the determined result from said determining means;
   said access point comprising:
      identifying means for identifying a broadcast identifier in the header of a received wireless ATM cell; and
      returning means for returning the wireless ATM cell if the broadcast identifier is identified by said identifying means, and transmitting the wireless ATM cell to a downstream burst.

2. A wireless asynchronous transfer mode communication system according to claim 1, wherein said switching means comprises:
   means for accepting the wireless ATM cell if the broadcast identifier does not indicate broadcast and if said header information agrees with connection information assigned to the mobile terminal itself, and discarding the wireless ATM cell if said header information does not agree with connection information assigned to the mobile terminal itself; and means for discarding the wireless ATM cell if the broadcast identifier indicates broadcast and if said header information agrees with connection information assigned to the mobile terminal itself, and accepting the wireless ATM cell if said header information does not agree with connection information assigned to the mobile terminal itself.

3. A wireless asynchronous transfer mode communication system, comprising:

an access point connected to a wireless communication network for performing wireless communications in an asynchronous transfer mode;

an ATM switch connected to said access point;

at least one mobile terminal present in an area covered by said access point, for performing wireless communications with said access point;

said mobile terminal comprising:

setting means for establishing a broadcast identifier representative of broadcast in the wireless overhead of each wireless ATM cell;

determining means for extracting said broadcast identifier established in the wireless ATM cell when a downstream burst is received, and determining whether the wireless ATM cell is a broadcast wireless ATM cell or not;

comparing means for, if the wireless ATM cell is a broadcast wireless ATM cell, extracting header information of the header of the wireless ATM cell and comparing the extracted header information with connection information assigned to the mobile terminal; and selecting means for, if said extracted header information agrees with said connection information, determining that the wireless ATM cell is a wireless ATM cell transmitted as a broadcast wireless ATM cell from the mobile terminal itself, and discarding the wireless ATM cell, and if said extracted header information does not agree with said connection information, determining that the wireless ATM cell is a wireless ATM cell transmitted from another mobile terminal itself, and accepting the wireless ATM cell;

said access point comprising:

monitoring means for determining whether there is a broadcast identifier in the wireless overhead of the wireless ATM cell received from the mobile terminal;

extracting means for, if there is a broadcast identifier in the wireless overhead, extracting the broadcast identifier of the received wireless ATM cell and a mobile terminal source identifier received from the mobile terminal; and returning means for, if the received wireless ATM cell is a broadcast wireless ATM cell, returning the received wireless ATM cell in the access point and transmitting the received wireless ATM cell to a downstream burst.

4. A wireless asynchronous transfer mode communication system, comprising:

an access point connected to a wireless communication network for performing wireless communications in an asynchronous transfer mode;

an ATM switch connected to said access point;

at least one mobile terminal present in an area covered by said access point, for performing wireless communications with said access point;

said mobile terminal comprising:

setting means for adding an n-bit broadcast identifier and an m-bit source identifier as connection information to the header of a wireless ATM cell for transmitting broadcast information;

extracting means for extracting a broadcast identifier and a source identifier from the connection information in the wireless ATM cell when a downstream burst is received; and selecting means for, if the broadcast identifier is effective, the wireless ATM cell is a broadcast wireless ATM cell, and the extracted broadcast identifier agrees with the source identifier of the mobile terminal itself, discarding the wireless ATM cell, and if the extracted broadcast identifier does not agree with the source identifier of the mobile terminal itself, accepting the wireless ATM cell as a broadcast wireless ATM cell;

said access point comprising:

determining means for extracting a broadcast identifier from the connection information in the header of the received wireless ATM cell, and determining whether the received wireless ATM cell is a broadcast wireless ATM cell based on the extracted broadcast identifier; and returning means for, if the received wireless ATM cell is a broadcast wireless ATM cell, returning the received wireless ATM cell in the access point and transmitting the received wireless ATM cell to a downstream burst.

5. A wireless asynchronous transfer mode communication system according to claim 3, wherein said access point comprises:

means for, if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

6. A wireless asynchronous transfer mode communication system according to claim 4, wherein said access point comprises:

means for, if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

7. A method of controlling broadcast in a wireless communication network for performing wireless communications in a wireless asynchronous transfer mode, the wireless communication network having an access point, an ATM switch connected to said access point, and at least one mobile terminal present in an area covered by said access point, for performing wireless communications with said access point, comprising the steps of:

establishing, with the mobile terminal, a broadcast identifier representative of broadcast in the header of each wireless ATM cell for performing broadcast;

identifying, with the access point, a broadcast identifier in the header of each wireless ATM cell received from the mobile terminal;

returning, with the access point, the wireless ATM cell if the broadcast identifier is identified, and transmitting the wireless ATM cell to a downstream burst;

determining, with the mobile terminal, the broadcast identifier and header information in the header of each received wireless ATM cell; and switching, with the mobile terminal, between acceptance and discarding of each received wireless ATM cell based on the determined result;

said step of switching comprising the steps of:

accepting the wireless ATM cell if the broadcast identifier does not indicate broadcast and if said header information agrees with connection information assigned to the mobile terminal itself, and discarding the wireless ATM cell if said header information does not agree with connection information assigned to the mobile terminal itself; and discarding the wireless ATM cell if the broadcast identifier indicates broadcast and if said header information agrees with connection information assigned to the mobile terminal itself, and accepting the wireless ATM cell if said header information does not agree with connection information assigned to the mobile terminal itself.

8. A method of controlling broadcast in a wireless communication network for performing wireless communications in a wireless asynchronous transfer mode, the wireless communication network having an access point, an ATM switch connected to said access point, and at least one mobile terminal present in an area covered by said access point, for performing wireless communications with said access point, comprising the steps of:

establishing, with said mobile terminal, a broadcast identifier representative of broadcast in the wireless overhead of each wireless ATM cell;

determining, with said access point, whether there is a broadcast identifier in the wireless overhead of the wireless ATM cell received from the mobile terminal;

if there is a broadcast identifier in the wireless overhead, extracting, with said access point, the broadcast identifier of the received wireless ATM cell and a mobile terminal source identifier received from the mobile terminal;

if the received wireless ATM cell is a broadcast wireless ATM cell, returning, with said access point, the received wireless ATM cell in the access point and transmitting the received wireless ATM cell to a downstream burst;

extracting, with said mobile terminal, said broadcast identifier established in the wireless ATM cell when a downstream burst is received, and determining whether the wireless ATM cell is a broadcast wireless ATM cell or not;

if the wireless ATM cell is a broadcast wireless ATM cell, extracting, with said mobile terminal, header information of the header of the wireless ATM cell and comparing, with said mobile terminal, the extracted header information with connection information assigned to the mobile terminal; and if said extracted header information agrees with said connection information, determining, with said mobile terminal, that the wireless ATM cell is a wireless ATM cell transmitted as a broadcast wireless ATM cell from the mobile terminal itself, and discarding the wireless ATM cell with said mobile terminal, and if said extracted header information does not agree with said connection information, determining, with said mobile terminal, that the wireless ATM cell is a wireless ATM cell transmitted from another mobile terminal itself, and accepting the wireless ATM cell with said mobile terminal.

9. A method of controlling broadcast in a wireless communication network for performing wireless communications in a wireless asynchronous transfer mode, the wireless communication network having an access point, an ATM switch connected to said access point, and at least one mobile terminal present in an area covered by said access point, for performing wireless communications with said access point, comprising the steps of:

adding, with said mobile terminal, an n-bit broadcast identifier and an m-bit source identifier as connection information to the header of a wireless ATM cell for transmitting broadcast information;

extracting, with said access point, a broadcast identifier from the connection information in the header of the received wireless ATM cell, and determining, said access point, whether the received wireless ATM cell is a broadcast wireless ATM cell based on the extracted broadcast identifier;

if the received wireless ATM cell is a broadcast wireless ATM cell, returning, with said access point, the received wireless ATM cell in the access point and transmitting the received wireless ATM cell to a downstream burst;

extracting, with said mobile terminal, a broadcast identifier and a source identifier from the connection information in the wireless ATM cell when a downstream burst is received; and if the broadcast identifier is effective, the wireless ATM cell is a broadcast wireless ATM cell, and the extracted broadcast identifier agrees with the source identifier of the mobile terminal itself, discarding the wireless ATM cell with said mobile terminal, and if the extracted broadcast identifier does not agree with the source identifier of the mobile terminal itself, accepting the wireless ATM cell as a broadcast wireless ATM cell with said mobile terminal.

10. A method according to claim 8, wherein said step of determining, with said access point, whether the received wireless ATM cell is a broadcast wireless ATM cell comprises the steps of:

if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

11. A method according to claim 9, wherein said step of determining, with said access point, whether the received wireless ATM cell is a broadcast wireless ATM cell comprises the steps of:

if the broadcast identifier is effective, the wireless ATM cell received from the mobile terminal is effective as a broadcast wireless ATM cell, the mobile terminal is set to a returning mode, the source identifier is changed to the broadcast identifier when the received wireless ATM cell is returned, and the source identifier of the returned wireless ATM cell agrees with the broadcast identifier of the mobile terminal itself, discarding the wireless ATM cell received from the mobile terminal, and if the source identifier of the returned wireless ATM cell does not agree with the broadcast identifier of the mobile terminal itself, accepting the wireless ATM cell received from the mobile terminal.

* * * * *